UNITED STATES PATENT OFFICE.

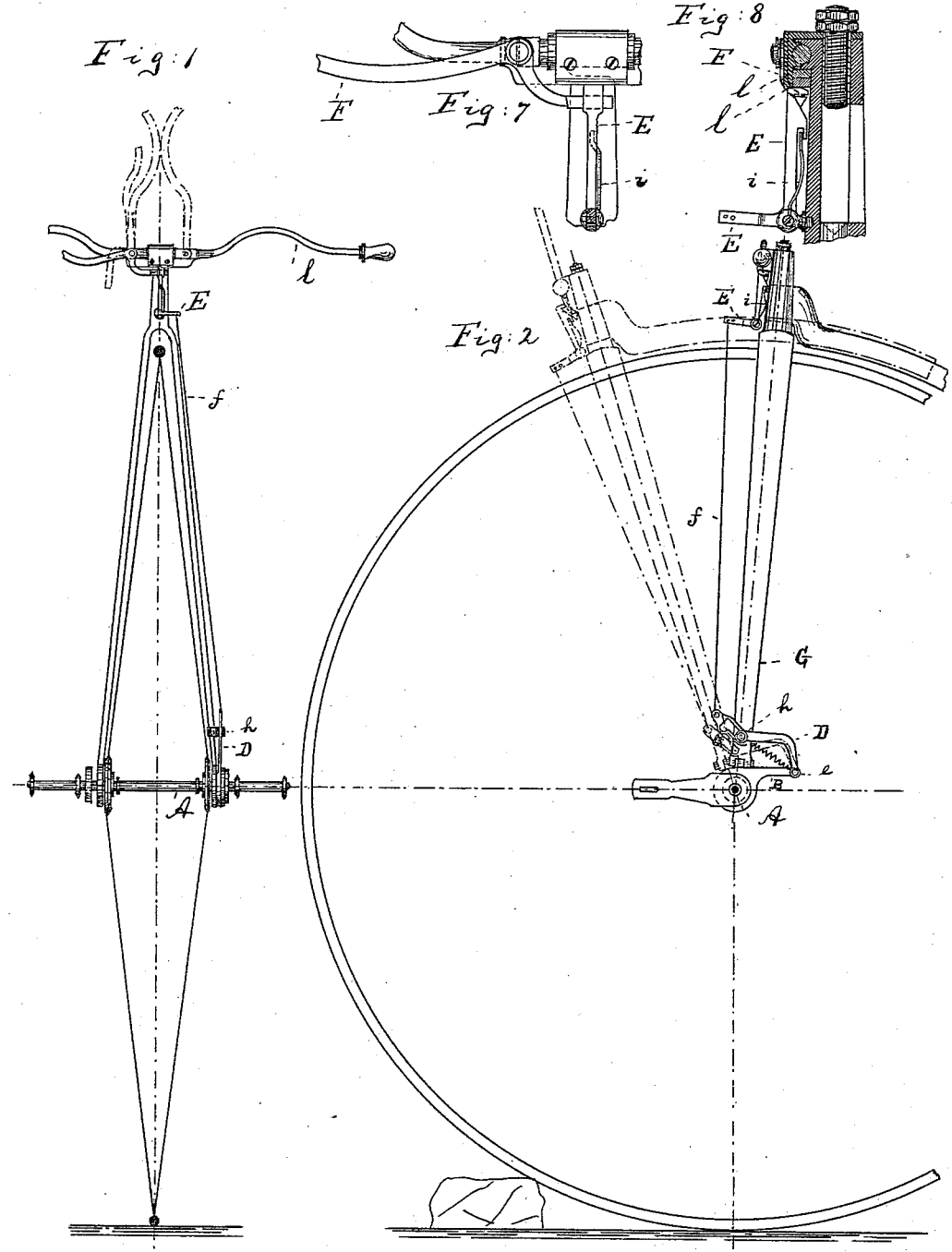

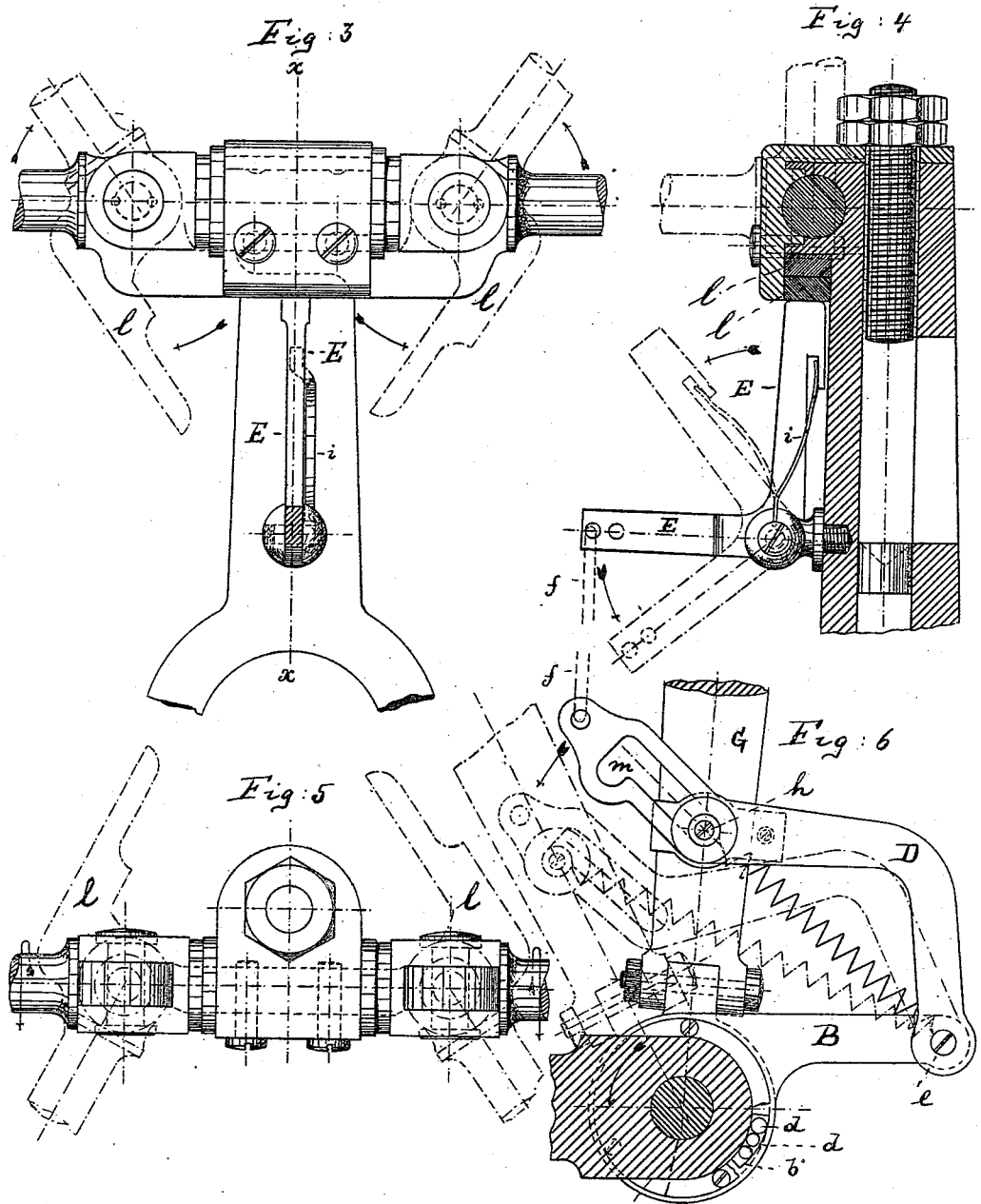

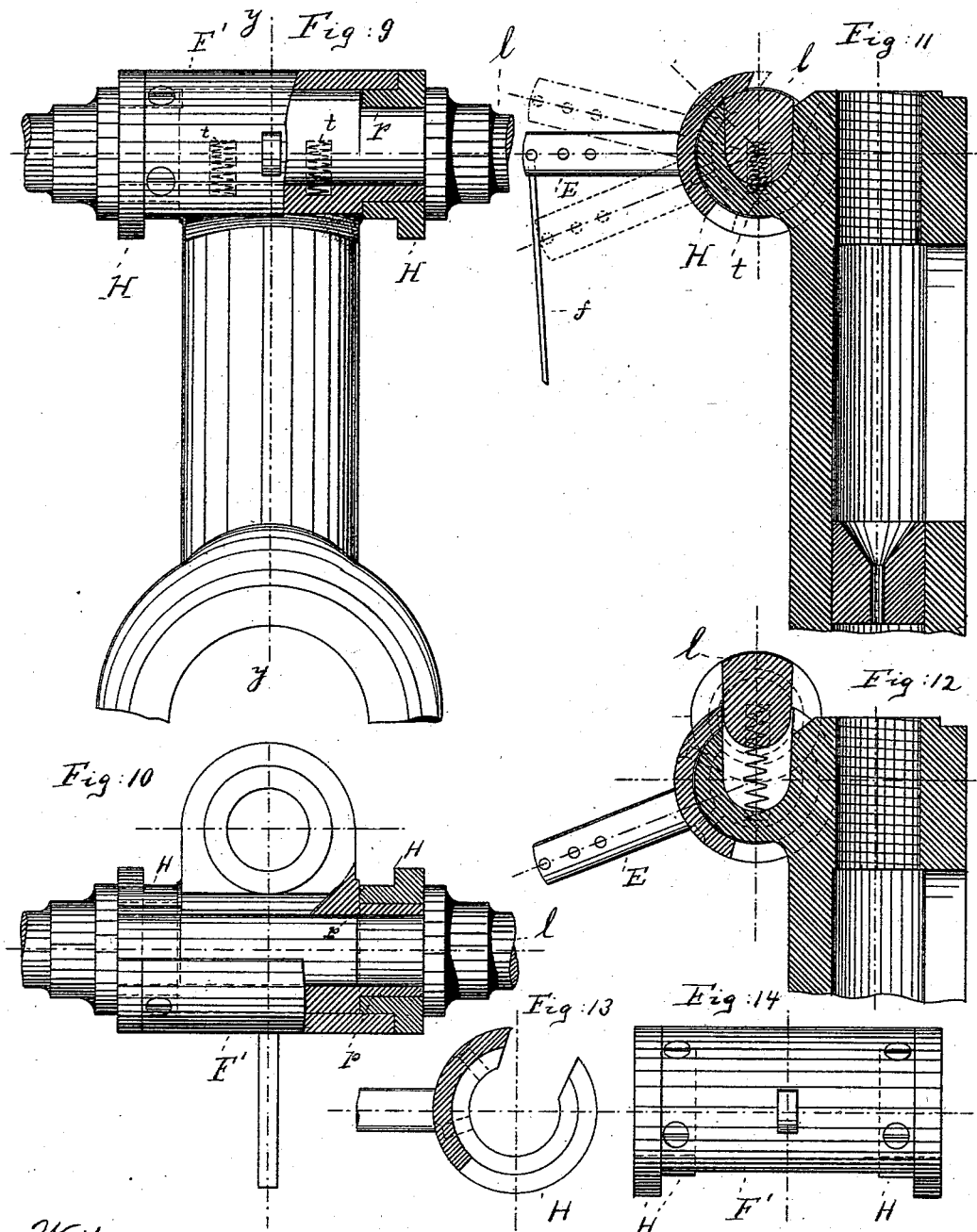

WALDEMAR SCHROETER, OF DELITZSCH, SAXONY, GERMANY.

VELOCIPEDE.

SPECIFICATION forming part of Letters Patent No. 379,290, dated March 13, 1888.

Application filed June 15, 1887. Serial No. 241,355. (No model.)

*To all whom it may concern:*

Be it known that I, WALDEMAR SCHROETER, of Delitzsch, Saxony, Germany, have invented a new and useful Improvement in Velocipedes, of which the following is a specification.

This invention relates to a velocipede so constructed that the hand-bar is automatically disengaged from its support as soon as the progress of the wheel is checked by an obstruction.

The invention consists in the various features of improvement more fully pointed out in the claims.

In the accompanying drawings, Figure 1 is a front view of a bicycle provided with my improvement. Fig. 2 is a side view of the same, showing the general arrangement. Fig. 3 is a front view of the central part of the hand-bar. Fig. 4 is a section through line $x$ $x$, Fig. 3. Fig. 5 is a top view of the central part of the hand-bar. Fig. 6 is a side view of the mechanism attached to the axle. Fig. 7 is a front view, and Fig. 8 a section, of the central part of the hand-bar, showing lever F. Fig. 9 is a front view, partly in section, of the central part of the hand-bar, showing a modification. Fig. 10 is a top view of the same, partly in section; Fig. 11, a cross-section through line $y$ $y$, Fig. 9; Fig. 12, a cross-section showing the hand-bar in a different position; Figs. 13 and 14, detail views of the sleeves H.

With particular reference to Figs. 1 to 8, the letter A represents the axle of a bicycle resting in bearing A'. This bearing is surrounded by the perforated end of a lever, B, pivoted at $e$ to an elbow-lever, D, having slot $m$, through which passes a pivot, $h$, secured to the frame or fork G of the machine. At the forward end the lever D connects, by chain or cord $f$, with the mechanism for releasing the hand-bar, as hereinafter described.

The bore of lever B is made of greater diameter than the bearing A', and between the bearing and the lever there are placed a number of rollers, $d$.

$b$ is a tapering projection on lever B, extending into the chamber or space between the parts A' B.

If the axle moves in a forward direction, the rollers $d$ will not act upon lever B; but if the wheel encounters an obstruction and the motion of the axle is checked the rollers $d$ will bear upon incline $b$ and lock lever B. The lever D will thus turn on pivot $e$, while pivot $h$ will travel along slot $m$. The upper end of the lever D will be drawn downwardly, and will pull the chain $f$, to set into action the disengaging mechanism. This mechanism consists of an elbow-lever, E, Fig. 4, pivoted to the head of the machine and connected at its lower arm to chain $f$, while its upper arm bears directly against the central ends of a divided hand-bar, $l$. This hand-bar consists of the two separately-pivoted bars $l$ $l$, adapted to overlap at their inner ends, Figs. 3 and 4, where they rest above the upper arm of lever E, as above described.

$i$ is a spring secured to lever E, and adapted to bring the lever back under arms $l$ $l$ after the tension on chain $f$ has ceased.

If desired to oscillate the arms $l$ $l$ by hand, a hand or knee lever, F, may be used, which bears upon lever E and causes it to move independent of chain $f$. The slot $m$ of lever D is provided with a depression at its upper end, which receives the pivot $h$ upon oscillation of lever D and prevents a further backward motion of the machine.

With particular reference to Figs. 9 to 14, the hand-bar $l$ is made in one piece, and is surrounded at the center by a pair of tubular sleeves, H, connected by a cross-piece, F', and having cut-away portion, as shown. The cross-piece F' is connected with lever E, which is in turn operated by chain $f$, the same as hereinbefore described. The hand-rod $l$ has shoulders $p$, that are engaged by the open ends of the sleeves H; but as soon as the lever E is oscillated it will partially revolve sleeves H, and the hand-rod $l$ will be liberated and may be lifted up and out of such sleeves. Springs $t$ serve to automatically raise the hand-rod.

What I claim is—

1. The combination, in a velocipede, of axle A with the levers B D, rollers $d$, and with the chain $f$, lever E, and a hand-bar, which is retained in position by lever E, substantially as specified.

2. The combination of axle A with lever B, having inclined projection $b$, and with lever D, having slot $m$, and with rollers $d$, lever E, spring $i$, and hand-bar $l$, substantially as described.

3. The combination of hand-rod $l$ with the tubular sleeve H, having cut-away portion, and with the spring $t$, substantially as specified.

In testimony whereof I have signed my name to this specification in the presence of two subscribing witnesses.

WALDEMAR SCHROETER.

Witnesses:
 EDMUND BACH,
 MAX MATTHÄI.